(12) United States Patent  (10) Patent No.: US 7,883,675 B2
Nakamura et al.  (45) Date of Patent: Feb. 8, 2011

(54) FUEL TREATMENT DEVICE

(75) Inventors: Masatoshi Nakamura, Osaka (JP); Takashi Nakagawa, Osaka (JP); Yuji Tsutsui, Osaka (JP); Masatoshi Teranishi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/666,891

(22) PCT Filed: Jun. 1, 2009

(86) PCT No.: PCT/JP2009/002440

§ 371 (c)(1),
(2), (4) Date: Feb. 4, 2010

(87) PCT Pub. No.: WO2009/150792

PCT Pub. Date: Dec. 17, 2009

(65) Prior Publication Data

US 2010/0202938 A1  Aug. 12, 2010

(30) Foreign Application Priority Data

Jun. 13, 2008 (JP) .............................. 2008-155417

(51) Int. Cl.
*B01J 8/08* (2006.01)
*B01J 8/02* (2006.01)
(52) U.S. Cl. ...................... 422/219; 422/211; 422/187; 48/61
(58) Field of Classification Search .................. 422/211, 422/219, 187; 48/61
See application file for complete search history.

(56) References Cited

U.S. PATENT DOCUMENTS 5,935,277 A * 8/1999 Autenrieth et al. ......... 48/127.9
2009/0162717 A1 6/2009 Nakagawa et al.

FOREIGN PATENT DOCUMENTS

| JP | 8-208202 | 8/1996 |
|---|---|---|
| JP | 11-26896 | 1/1999 |
| JP | 2003-63593 | 3/2003 |
| JP | 2005-247596 | 9/2005 |
| JP | 2007-331985 | 12/2007 |

* cited by examiner

*Primary Examiner*—Walter D Griffin
*Assistant Examiner*—Lessanework Seifu
(74) *Attorney, Agent, or Firm*—Greenblum & Bernstein, P.L.C.

(57) ABSTRACT

The present invention provides a fuel treatment device which can realize easy separation and collection of a catalyst contained in the device. In a fuel treatment device (21) of the present invention a fuel gas is supplied to a catalyst, which fills a catalyst filling space (24) surrounded by a cylindrical inner circumferential wall and a cylindrical outer circumferential wall, to produce a reformed gas. The fuel treatment device (21) has a removal section indicator indicating a catalyst removal section (29) on the outer circumferential surface of the outer circumferential wall of the cylindrical catalyst filling space (24) and an opening formation assister assisting the formation of a catalyst removal opening for removing the catalyst. The removal section indicator and the opening formation assister are, for example, an oval annular shallow groove (30) formed at the outer circumferential wall of the catalyst filling space (24) over substantially the entire length in the axial direction of the catalyst filling space (24). When a catalyst (25) is collected from the fuel treatment device (21) after a lapse of a period of use, the catalyst removal opening (29) surrounded by the annular shallow groove (30) is cut off, and a catalyst removal opening (40) is formed.

11 Claims, 13 Drawing Sheets

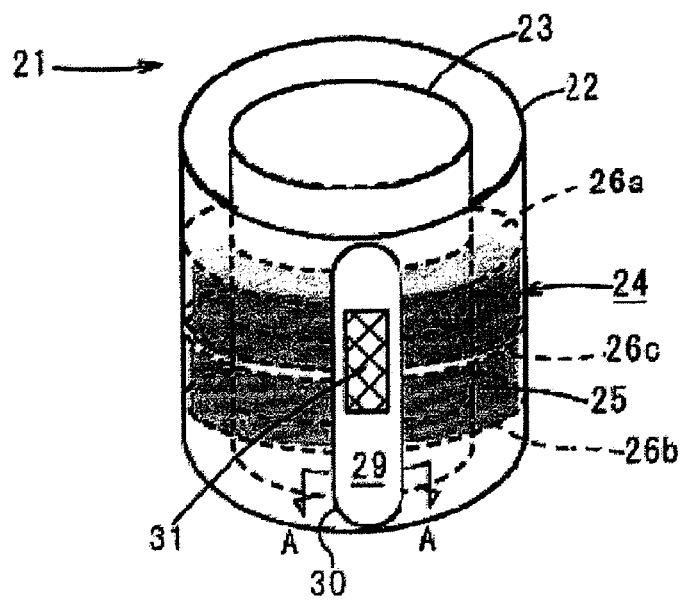
FIG.2A
FIG.2B
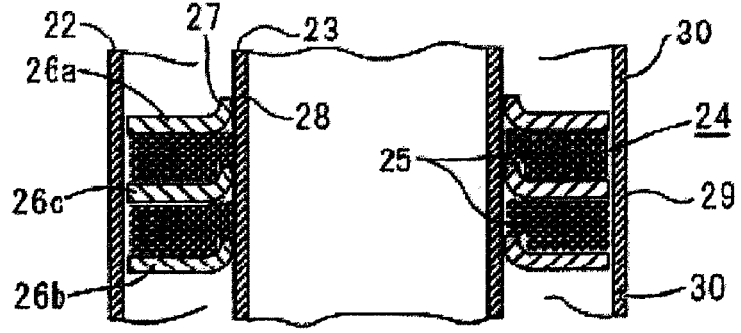
FIG.2C
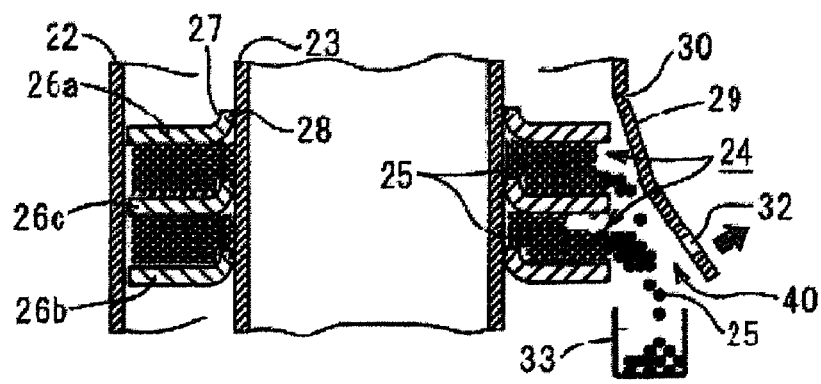
FIG.2D

US 7,883,675 B2

FUEL TREATMENT DEVICE

TECHNICAL FIELD

The present invention relates to a fuel treatment device which steam-reforms a hydrocarbon-based fuel gas such as a town gas and an LPG to produce a hydrogen-rich reformed gas.

BACKGROUND ART

As a conventional fuel treatment device, there has been known one which has a cylindrical shape on the whole, includes on its center a heater having a burner, and includes around the heater a reformer filled with a reforming catalyst, a transformer filled with a carbon monoxide (CO) transforming catalyst, and a CO remover filled with a carbon monoxide (CO) removal catalyst, which are arranged in parallel in the axial direction (see, Patent Literature 1). In this fuel treatment device, a raw material and reforming water are supplied to a gas flow channel serving as an evaporator provided around the heater, and the raw material and generated vapor are supplied to the reformer. Further, a hydrogen-containing gas delivered from the reformer is sequentially supplied to the transformer, provided at the outer circumference of the gas flow channel, and the CO remover, whereby a reformed gas is produced.

FIG. 1 is a longitudinal cross-sectional view showing a structure of the fuel treatment device described in Patent Literature 1.

Fuel treatment device 1 shown in FIG. 1 has a cylindrical shape on the whole and is heat-insulated by heat insulating material 1a covering the outer surface of fuel treatment device 1. Fuel treatment device 1 has on its center heater 5 having combustion cylinder 3 arranged with burner 2 and exhaust gas passage 4 at the outer circumference of combustion cylinder 3. Outlet 4a of exhaust gas passage 4 is opened to outside. First gas flow channel 6 serving as an evaporator is provided at an outlet side portion of the outer circumference of exhaust gas passage 4 of heater 5. Reformer 8 filled with reforming catalyst 7 is provided at the outer circumference of exhaust gas passage 4 on the side to which a high-temperature exhaust gas flows from combustion cylinder 3. Reformer 8 has at its outer circumference second gas flow channel 9 for circulating a hydrogen-containing gas, delivered from reformer 8, toward the side of the outer circumference of first gas flow channel 6. Transformer 11 filled with CO transforming catalyst 10 is provided at the outer circumference of the first gas flow channel 6 on the side of reformer 8. CO remover 14 filled with CO removal catalyst 13 is provided at the outer circumference of first gas flow channel 6 on the side farther from reformer 8 and connected to third gas flow channel 12 provided more inwardly than CO remover 14 in the radial direction.

A raw material is supplied from inlet 6a of first gas flow channel 6 to be mixed with reforming water in inlet 6a. The reforming water is supplied through heating coil 15 wound around the outer circumference of transformer 11 and CO remover 14. The raw material and the reforming water are heated while passing through first gas flow channel 6 serving as an evaporator. The high-temperature raw material and vapor are supplied to reformer 8, and the raw material is steam-reformed by the action of reforming catalyst 7 to be a hydrogen-rich hydrogen-containing gas.

The hydrogen-containing gas delivered from reformer 8 is supplied to transformer 11 through second gas flow channel 9, and carbon monoxide (CO) contained in the hydrogen-containing gas is reduced by the action of CO transforming catalyst 10. The hydrogen-containing gas delivered from transformer 11 is mixed with air introduced from air inlet 16a in air mixing space 16 provided between transformer 11 and third gas flow channel 12. The hydrogen-containing gas mixed with the air is supplied to CO remover 14 through third gas flow channel 12, CO is then removed by the action of CO removal catalyst 13, and the hydrogen-containing gas is delivered from outlet 17.

The fuel treatment device shown in FIG. 1 has third gas flow channel 12 interposed between CO remover 14 and high-temperature first gas flow channel 6. Therefore, while the temperature at the downstream portion of transformer 11 can be maintained at a temperature suitable for reaction (for example, 200° C.), the entrance temperature of CO remover 14 can be maintained at a temperature of a level short of excessively promoting oxidation reaction (for example, 150° C.). Namely, it is advantageous that transformer 11 and CO remover 14 can be maintained at a suitable temperature.

Patent Literature 2 discloses a fuel reformer filled with a granular reforming catalyst. Specifically, a plurality of partition walls are provided at an interval along a direction of circulating a raw fuel, and the granular reforming catalyst is loaded on the disposed partition walls. The partition walls have through-holes, and a gap is provided between the partition wall and a cylindrical body of the fuel reformer.

In addition, there is also an attempt to expressly indicating a reusable member to promote recycle (see, Patent Literature 3).

Patent Literature 1: Japanese Patent Application Laid-Open No. 2007-331985
Patent Literature 2: Japanese Patent Application Laid-Open No. 8-208202
Patent Literature 3: Japanese Patent Application Laid-Open No. 11-26896

DISCLOSURE OF INVENTION

Problems to be Solved by the Invention

When fuel treatment device 1 having the structure shown in FIG. 1 is discarded after use for a predetermined period of time, it is preferable to reuse discarded materials. Particularly, it is very important in terms of resource saving and cost to separate and collect reforming catalyst 7 containing noble metal, CO transforming catalyst 10, and CO removal catalyst 13, and effectively recycle them. However, fuel treatment device 1 has a cylindrical-shaped body, and therefore, at the site of collection and treatment, which of the catalysts are loaded in which of the portions of fuel treatment device 1 cannot be easily determined from the appearance of fuel treatment device 1. Thus, it is considered to specify the catalyst-filling positions and the removal method in the specification of fuel treatment device 1. However, at the collection and treatment site of treating various types of the fuel treatment devices, it is in fact difficult to confirm each specification point by point, and thus it is difficult to separate and collect each catalyst. Further, since fuel treatment device 1 has a smooth cylindrical outer surface, an opening for removing catalysts cannot be easily formed on the surface.

It is an object of the present invention to provide a fuel treatment device which allows catalysts filling the fuel treatment device to be easily separated and collected.

Means for Solving the Problem

In a fuel treatment device of the present invention a fuel gas is supplied to a catalyst to produce a reformed gas. The catalyst fills a catalyst filling space surrounded by a cylindrical outer circumferential wall or by a cylindrical inner circumferential wall and a cylindrical outer circumferential wall and arranged along the center axis of the cylinder. The fuel treatment device includes the following means:

(1) a removal section indicator that indicates a position of a catalyst removal section for removing the loaded catalyst to outside on the outer circumferential surface of the outer circumferential wall; and (2) an opening formation assister that assists the formation of a catalyst removal opening in the catalyst removal section.

Effects of the Invention

According to the present invention, the catalyst removal opening can be easily formed in the catalyst removal section indicated by the removal section indicator provided on the outer circumferential surface of the outer circumferential wall, and the catalyst filling the catalyst filling space can be easily removed to the outside through the catalyst removal opening. Namely, the catalyst can be easily and reliably collected without requiring troublesome work for confirming the position of the catalyst filling space.

When a plurality of kinds of catalysts fills different catalyst filling spaces, the catalyst removal section indicated by the removal section indicator can be provided for each catalyst. With this configuration, different kinds of catalysts can be reliably separated and collected for each kind of catalyst without causing mixing of the different catalysts before collection.

BRIEF DESCRIPTION OF DRAWINGS

FIG. 2A is a perspective view showing a relevant structure of a first example of a fuel treatment device according to Embodiment 1; FIG. 2B is a cross-sectional view taken along arrows A-A of FIG. 2A; FIG. 2C is a cross-sectional view showing a relevant structure of the first example of the fuel treatment device according to Embodiment 1; and FIG. 2D is a cross-sectional view showing the relevant structure of the first example of the fuel treatment device according to Embodiment 1 when a catalyst is removed;

BEST MODE FOR CARRYING OUT THE INVENTION

Figure 1:
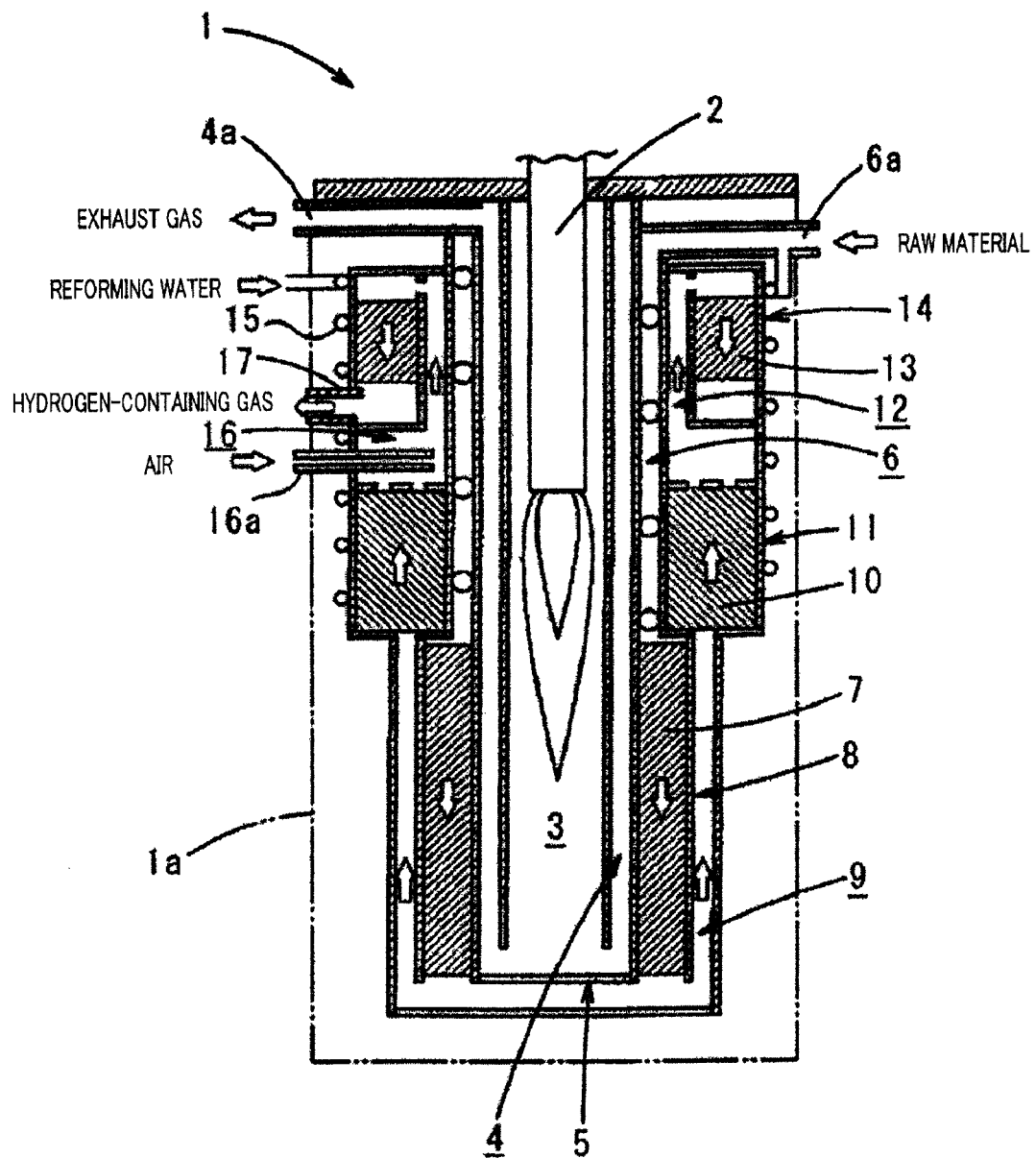
FIG. 1 is a longitudinal cross-sectional view showing a structure of a fuel treatment device of a conventional example.

Hereinafter, embodiments of the present invention will be described in detail with reference to the drawings.

Embodiment 1

FIRST STRUCTURE EXAMPLE

FIGS. 2A to 2D show a first example of a relevant structure of a fuel treatment device according to Embodiment 1 of the present invention. FIG. 2A is a perspective view of a relevant portion of the fuel treatment device. FIG. 2B is a cross-sectional view taken along arrows A-A of FIG. 2B. FIG. 2C is a cross-sectional view of the relevant portion of the fuel treatment device. FIG. 2D is a cross-sectional view of the relevant portion of the fuel treatment device when a catalyst is removed.

As shown in FIGS. 2A to 2D, fuel treatment device 21 includes outer circumferential wall 22, inner circumferential wall 23, and cylindrical catalyst filling space 24 provided between outer circumferential wall 22 and inner circumferential wall 23.

Granular catalyst 25 fills catalyst filling space 24. Although the particle diameter of catalyst 25 is not particularly limited, catalyst 25 may have a particle diameter of about 2 mm. Catalyst filling space 24 is partitioned by upper shelf plate 26a defining the upper end surface of catalyst filling space 24 and lower shelf plate 26b defining the lower end surface of catalyst filling space 24. When necessary, intermediate shelf plate 26c may be provided between shelf plates 26a and 26b. When the catalyst is deteriorated, intermediate shelf plate 26c can prevent the catalyst from being unevenly distributed toward the lower portion of catalyst filling space 24 and prevent the catalyst action from being not satisfactorily exerted.

Shelf plates 26a, 26b, and 26c are preferably porous circular plates with a large number of holes so that a raw material gas and a hydrogen-containing gas are circulated. In order to prevent catalyst 25 from dropping through the holes, the hole diameter may be smaller than the particle diameter of catalyst 25, and, for example, may be less than 1 mm.

Shelf plates 26a, 26b, and 26c each have curve portion 27 formed at the inner circumferential portion. Curve portion 27 is pressure-bonded to the outer circumferential surface of inner circumferential wall 23, and, when necessary, integrally fixed or welded by weld 28. On the other hand, the outer circumferential portions of shelf plates 26a, 26b, and 26c each may be abutted against the inner circumferential surface of outer circumferential wall 22 or may be slightly spaced from the inner circumferential surface of outer circumferential wall 22; however, in any case, it is preferable that they are not fixed to outer circumferential wall 22.

Catalyst removal section 29 is provided to outer circumferential wall 22 at a portion facing catalyst filling space 24. Catalyst removal section 29 has a size corresponding to substantially the entire length in the axial direction of catalyst filling space 24 and has a width dimension in the circumferential direction so as to constitute an appropriate portion in the circumferential direction. Catalyst removal section 29 has an oval shape, for example, and is partitioned by annular shallow groove 30 provided along the outer line of catalyst removal section 29. Consequently, annular shallow groove 30 also serves as a removal section indicator.

The width dimension in the circumferential direction of catalyst removal section 29 is preferably set to be at least larger than the particle diameter of catalyst 25, and actually preferably about several times to several ten times the particle diameter, for example, about 20 mm. Since annular shallow groove 30 serves as a cutting line, catalyst removal section 29 can be cut off from outer circumferential wall 22, whereby catalyst removal opening 40 can be formed. Therefore, annular shallow groove 30 also serves as an opening formation assister.

Although annular shallow groove 30 serves as the removal section indicator and the opening formation assister, the removal section indicator and the opening formation assister may be provided separately. For example, annular shallow groove 30 as the opening formation assister may be formed on the inner circumferential surface of outer circumferential wall 22 corresponding to the catalyst removal section, and the catalyst removal section indicator may be formed on the outer circumferential surface of outer circumferential wall 22 by engraving or a laser printing process, or a protrusion may be provided for indicating the catalyst removal section.

The annular shallow groove 30 can be formed by press-forming simultaneously with the formation of outer circumferential wall 22. For example, when a stainless steel plate is press-formed to produce outer circumferential wall 22, annular shallow groove 30 may be simultaneously formed by press-forming.

When the fuel treatment device is driven, outer circumferential wall 22 is exposed to high temperatures. The depth of annular shallow groove 30 is preferably about 1/5 to 1/20 of the thickness of the steel plate so as to prevent a crack or fracture from occurring in annular shallow groove 30 due to thermal stress generated by exposure to high temperatures.

Catalyst indicator 31 for indicating the kind of catalyst 25 removed from catalyst removal section 29 is provided at a suitable portion of the outer surface of catalyst removal section 29 or near the edge of catalyst removal section 29. Catalyst indicator 31 can be formed by engraving or a laser printing process. In addition to the kind of catalyst 25, a method for removing the catalyst may also be indicated on an indication section of catalyst indicator 31. The catalyst removal method is preferably indicated as a diagram.

When catalyst 25 is to be removed for collection from catalyst filling space 24 in the above structure, catalyst removal section 29 of outer circumferential wall 22 is confirmed, and catalyst indicator 31 provided on the surface of catalyst removal section 29 or near thereof is read, confirming the kind of catalyst 25 to be removed.

The kind and composition of catalyst 25 are different depending on the function required for catalyst 25, for example, depending on whether catalyst 25 is a reforming catalyst, a CO transforming catalyst, or a CO removal catalyst. Catalyst 25 is often an alloy containing a noble metal, such as a ruthenium catalyst. Catalyst indicator 31 preferably indicates the content or the content ratio of a noble metal (for example, ruthenium). The content may be indicated by weight, and the content ratio may be indicated by percent by weight, for example; however, they are not limited thereto.

Catalyst indicator 31 may indicate the catalyst removal method. The indicated catalyst removal method is read, and catalyst removal opening 40 is formed in catalyst removal section 29 in accordance with the method.

As shown in FIG. 2D, hook hole 32 is formed in the lower portion of catalyst removal section 29 with a drill or the like (not shown). When a bar (not shown) or the like is hooked in hook hole 32 and strongly pulled in the direction of an arrow, outer circumferential wall 22 is cut along the cutting line formed of oval annular shallow groove 30. Then, catalyst removal section 29 is easily cut off from outer circumferential wall 22 to form catalyst removal opening 40. Catalyst 25 is removed outside through catalyst removal opening 40. Catalyst 25 is collected in collection vessel 33. Since each inner circumferential portion of shelf plates 26a, 26b, and 26c is curved as curve portion 27, the loaded catalyst 25 is easily removed outside.

SECOND STRUCTURE EXAMPLE

Figure 3A:
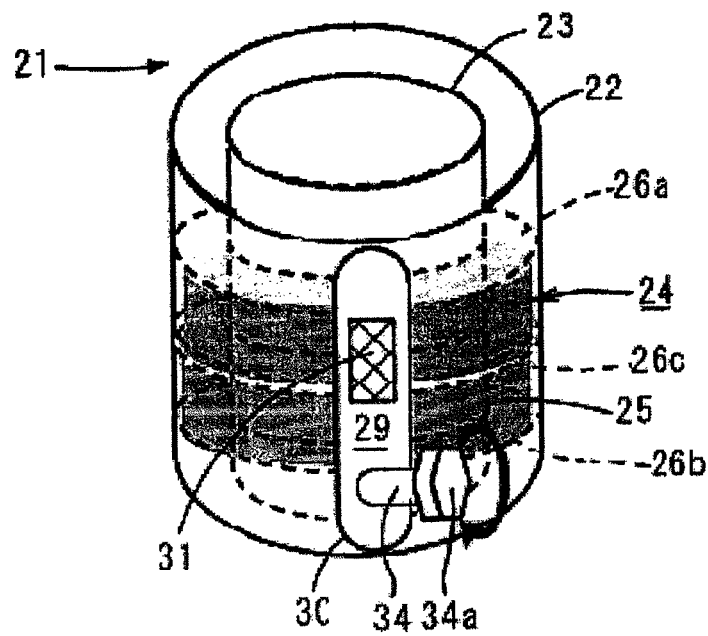
FIG. 3A is a perspective view showing a relevant structure of a second example of the fuel treatment device according to Embodiment 1.
Figure 3B:
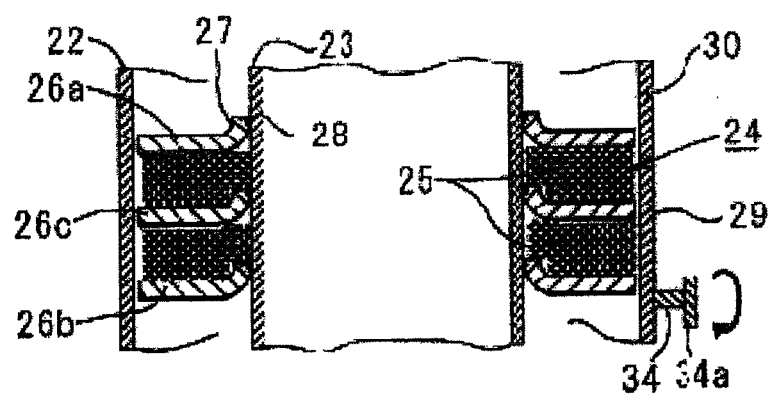
FIG. 3B is a cross-sectional view showing a relevant structure of the second example of the fuel treatment device according to Embodiment 1.
Figure 3C:
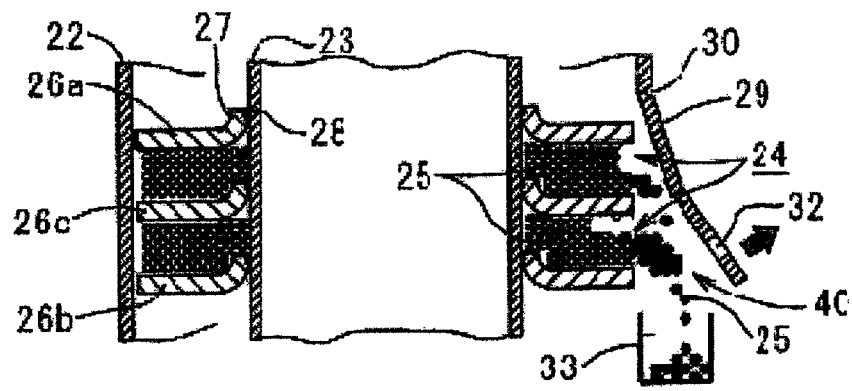
FIG. 3C is a cross-sectional view showing the relevant structure of the second example of the fuel treatment device according to Embodiment 1 when the catalyst is removed.

FIGS. 3A to 3C show a second example of a relevant structure of the fuel treatment device according to Embodiment 1. FIG. 3A is a perspective view of a relevant portion of the fuel treatment device. FIG. 3B is a cross-sectional view of the relevant portion of the fuel treatment device. FIG. 3C is a cross-sectional view of the relevant portion of the fuel treatment device when the catalyst is removed.

As shown in FIG. 3A, shaft portion 34 which is a protrusion is integrally fixed to the lower end portion of the outer surface of catalyst removal section 29. Shaft portion 34 may have a polygonal head portion 34a at the end. As shown in FIG. 3B, when catalyst 25 is removed, head portion 34a of shaft portion 34 is rotated with a spanner (not shown) to wrench off the fixed portion of headed shaft portion 34 of catalyst removal section 29, and, thus, to form hook hole 32. Thereafter, as shown in FIG. 3C, catalyst 25 is collected in collection vessel 33 as in the case of the first example.

THIRD STRUCTURE EXAMPLE

Figure 4A:
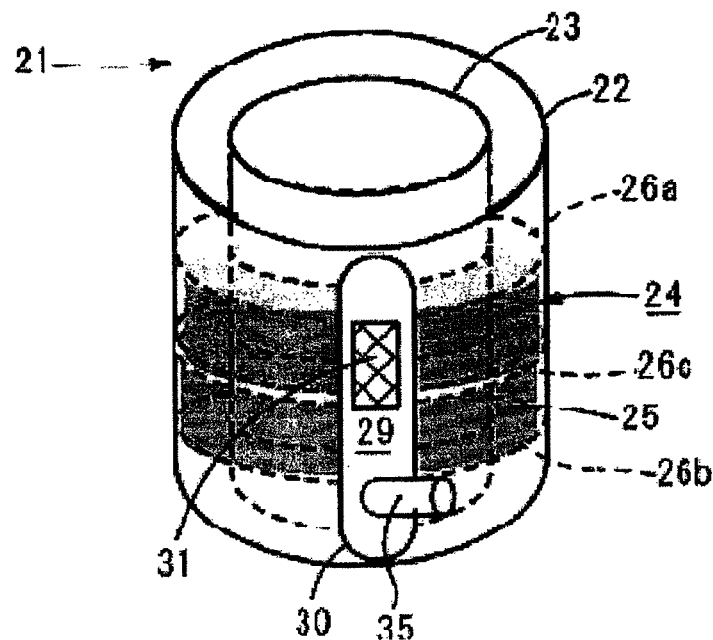
FIG. 4A is a perspective view showing a relevant structure of a third example of the fuel treatment device according to Embodiment 1.
Figure 4B:
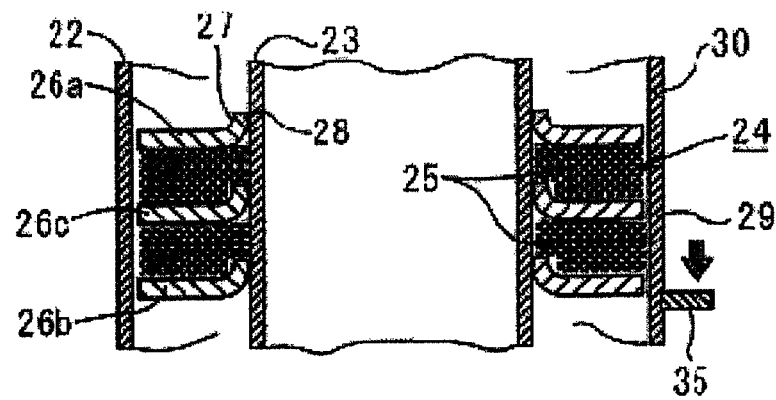
FIG. 4B is a cross-sectional view showing a relevant structure of the third example of the fuel treatment device according to Embodiment 1.
Figure 4C:
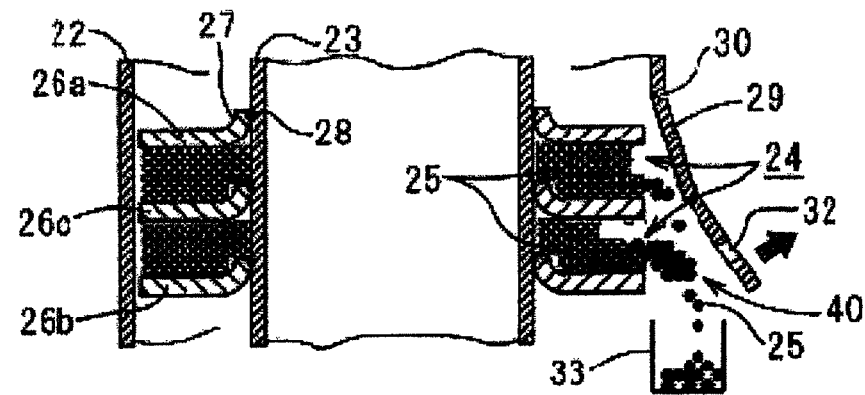
FIG. 4C is a cross-sectional view of the relevant structure of the third example of the fuel treatment device according to Embodiment 1 when the catalyst is removed.

FIGS. 4A to 4C show a third example of a relevant structure of the fuel treatment device according to Embodiment 1. FIG. 4A is a perspective view of a relevant portion of the fuel treatment device. FIG. 4B is a cross-sectional view of the relevant portion of the fuel treatment device. FIG. 4C is a cross-sectional view of the relevant portion of the fuel treatment device when the catalyst is removed.

As shown in FIG. 4A, projecting shaft 35 which is a protrusion is integrally fixed to the lower end portion of the outer surface of catalyst removal section 29. As shown by the arrow in FIG. 4B, when catalyst 25 is removed, projecting shaft 35 is hit by a hammer (not shown) or the like to fracture the fixed portion of projecting shaft 35 of catalyst removal section 29, and, thus, to form hook hole 32. Thereafter, as shown in FIG. 4C, catalyst 25 is collected in collection vessel 33 as in the case of the first example.

FOURTH STRUCTURE EXAMPLE

Figure 5A:
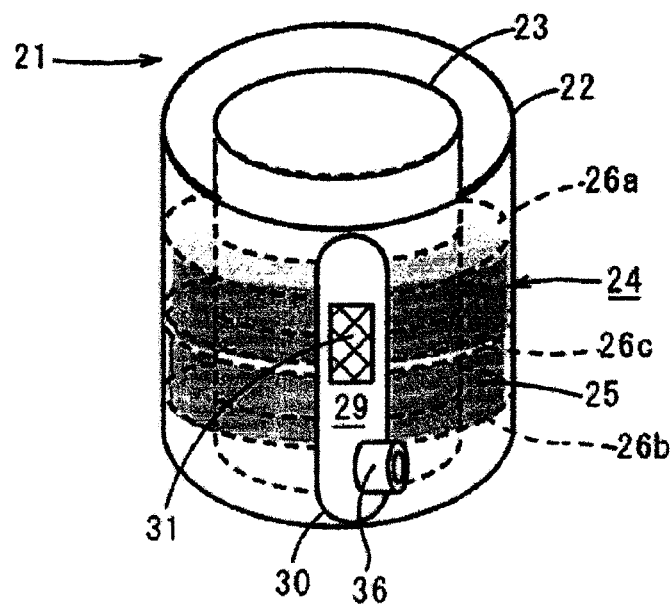
FIG. 5A is a perspective view showing a relevant structure of a fourth example of the fuel treatment device according to Embodiment 1.
Figure 5B:
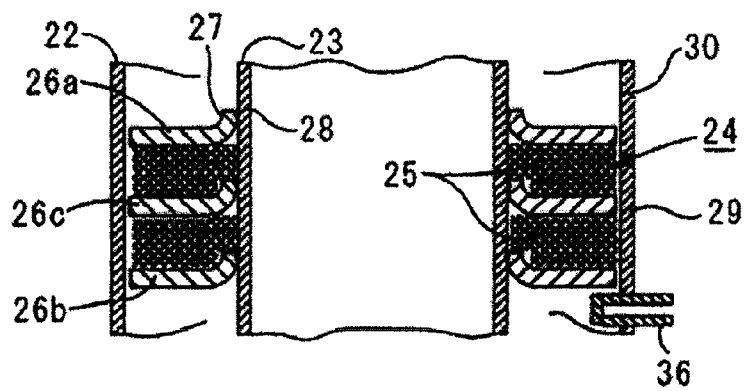
FIG. 5B is a cross-sectional view showing a relevant structure of the fourth example of the fuel treatment device according to Embodiment 1.
Figure 5C:
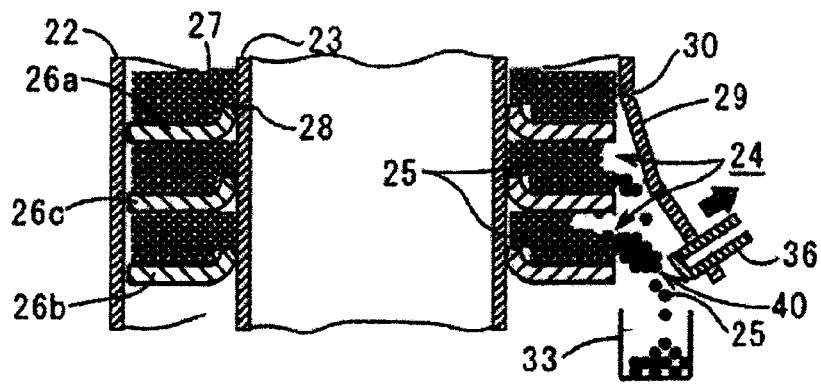
FIG. 5C is a cross-sectional view showing the relevant structure of the fourth example of the fuel treatment device according to Embodiment 1 when the catalyst is removed.

FIGS. 5A to 5C show a fourth example of a relevant structure of the fuel treatment device according to Embodiment 1. FIG. 5A is a perspective view of a relevant portion of the fuel treatment device. FIG. 5B is a cross-sectional view of the relevant portion of the fuel treatment device. FIG. 5C is a cross-sectional view of the relevant portion of the fuel treatment device when the catalyst is removed.

As shown in FIGS. 5A and 5B, bottomed short pipe 36 which is a protrusion is integrally fixed to the lower end portion of catalyst removal section 29. As shown in FIG. 5C, when catalyst is removed, the front end portion of a bar (not shown) is inserted into short pipe 36, and the lower portion of catalyst removal section 29 is forcibly opened in the direction of the arrow. According to this structure, catalyst 25 is collected in collection vessel 33 as in the case of the first example.

FIFTH STRUCTURE EXAMPLE

Figure 6A:
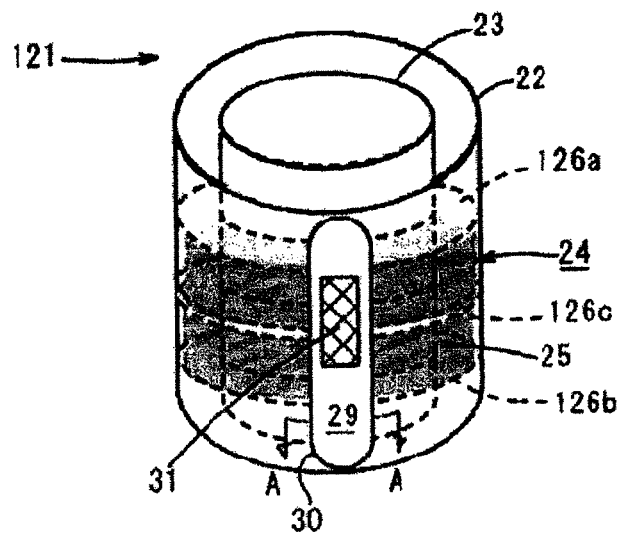
FIG. 6A is a perspective view showing a relevant structure of a fifth example of the fuel treatment device according to Embodiment 1.
Figure 6B:
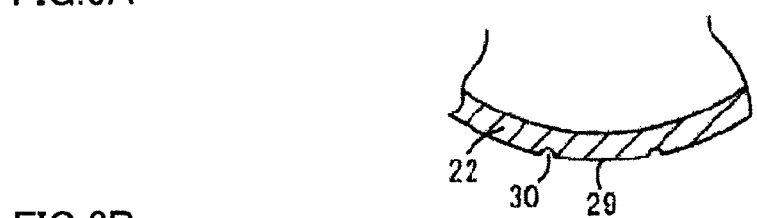
FIG. 6B is a cross-sectional view taken along arrows A-A of FIG. 6A.
Figure 6C:
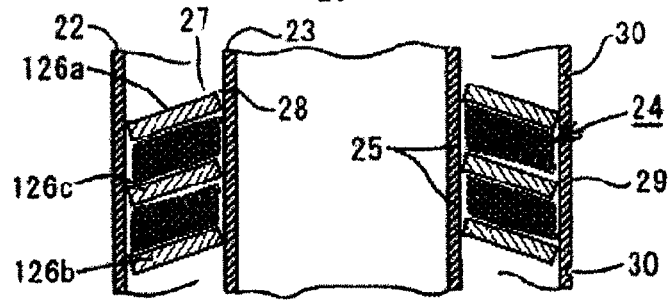
FIG. 6C is a cross-sectional view showing a relevant structure of the fifth example of the fuel treatment device according to Embodiment 1.
Figure 6D:
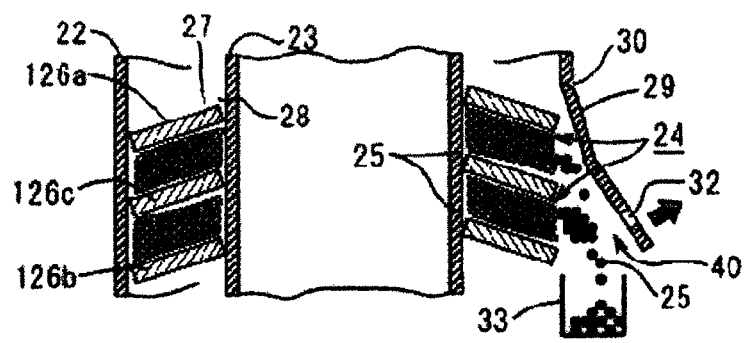
FIG. 6D is a cross-sectional view showing the relevant structure of the fifth example of the fuel treatment device according to Embodiment 1 when the catalyst is removed.

FIGS. 6A to 6D show a fifth example of a relevant structure of the fuel treatment device according to Embodiment 1. FIG. 6A is a perspective view of a relevant portion of the fuel treatment device. FIG. 6B is a cross-sectional view taken along arrows A-A of FIG. 6A. FIG. 6C is a cross-sectional view of the relevant portion of the fuel treatment device. FIG. 6D is a cross-sectional view of the relevant portion of the fuel treatment device when the catalyst is removed. The same components as those in FIG. 2 are assigned the same reference numerals, and the descriptions of the overlapping portions are not repeated.

The inner circumferential portions of shelf plates 126a, 126b, and 126c are abutted against the outer circumferential surface of inner circumferential wall 23, and, when necessary, integrally fixed to the outer circumferential surface of inner circumferential wall 23 by weld 28. On the other hand, the outer circumferential portions of shelf plates 126a, 126b, and 126c are respectively abutted against outer circumferential wall 22 or slightly spaced from outer circumferential wall 22, and thus not fixed to outer circumferential wall 22. The shelf plates 126a, 126b, and 126c each have an inclination of a predetermined angle, and the position of the inner circumferential portion is higher than the position of the outer circumferential portion.

In the fifth structure example, as in the first structure example, the catalyst filling catalyst filling space 24 is supported by the multiple shelf plates, whereby the catalyst is prevented from being unevenly distributed toward the lower portion of catalyst filling space 24 due to the deterioration of the catalyst, and thus reduction of the catalyst action can be prevented. Further, shelf plates 126a, 126b, and 126c are inclined at a predetermined angle, and the outer circumferential portion is located lower than the inner circumferential portion. Therefore, as shown in FIG. 6D, when the catalyst is removed, catalyst 25 properly falls along the inclined face of the shelf plate, and therefore, removing workability is improved.

The structure examples of Embodiment 1 can be applied to Embodiments 2 to 4 to be described later.

As described above, fuel treatment device 21 (or 121) of Embodiment 1 has oval annular shallow groove 30 formed in the outer circumferential surface or inner circumferential surface of the outer circumferential wall surrounding catalyst filling space 24, and annular shallow groove 30 covers over substantially the entire length in the axial direction of catalyst filling space 24. Annular shallow groove 30 serves as the opening formation assister for assisting the formation of the catalyst removal opening through which the catalyst is removed. Annular shallow groove 30 provided on the outer circumferential surface of the outer circumferential wall further serves as the removal section indicator for indicating catalyst removal section 29. The catalyst removal opening is formed in catalyst removal section 29, and consequently the loaded catalyst can be easily separated and collected. Specifically, the following effects can be obtained.

(1) When catalyst 25 filling fuel treatment device 21 is collected from fuel treatment device 21 after a lapse of a period of use, catalyst removal section 29 surrounded by annular shallow groove 30 of outer circumferential wall 22 is cut off, whereby catalyst removal opening 40 can be formed. Therefore, an opening communicating to catalyst filling space 24 can be reliably formed without a troublesome work for confirming the position of catalyst filling space 24. With this configuration, the loaded catalyst 25 can be easily removed. Annular shallow groove 30 also serves as the opening formation assister. Namely, when an external force is applied to catalyst removal section 29, the stress concentrates on annular shallow groove 30 at the peripheral edge of catalyst removal section 29, and catalyst removal section 29 is easily cut along annular shallow groove 30. Therefore, catalyst removal section 29 can be easily opened, and catalyst 25 can be removed with high workability.

(2) In fuel treatment device 21, sometimes different kinds of catalysts 25 may be respectively loaded in a plurality of catalyst filling spaces 24. When catalyst filling spaces 24 each have the removal section indicator and the opening formation assister, there is no possibility that the different kinds of catalysts 25 are removed in a state that catalysts 25 are mixed, and catalysts 25 can be reliably separated and collected for each kind.

(3) Annular shallow groove 30 is provided over substantially the entire length in the axial direction of catalyst filling space 24, whereby the catalyst removal opening to be formed is also provided over substantially the entire length in the axial direction of catalyst filling space 24. Therefore, catalyst 25 can be removed with high workability. Since annular shallow groove 30 has an annular shape and is curved, the thermal stress acting on outer circumferential wall 22 does not concentrate locally, and therefore, there is no possibility that annular shallow groove 30 is unexpectedly fractured.

(4) Catalyst indicator 31 indicating the kind of a catalyst is provided in catalyst removal section 29, whereby the kind of catalyst 25 to be removed can be easily specified, and catalyst 25 can be easily and reliably separated and collected. The catalyst indicator may be a character, a symbol, or a pattern previously determined for each catalyst. The catalyst indicator is preferably printed by stamping or laser processing. If the catalyst indicator is printed or applied using a paint, it may undesirably undergo degradation by exposure to high temperatures.

(5) The opening formation assister for the formation of the catalyst removal opening is provided along with or separately from the removal section indicator, and therefore, the catalyst removal opening having a necessary size can be easily formed, whereby the catalyst filling the catalyst filling space can be removed with high workability.

(6) The opening formation assister formed of the annular shallow groove surrounding the peripheral edge of the catalyst removal section is provided, and therefore, when an external force is applied to the catalyst removal section, the stress concentrates on the shallow groove, and the shallow groove is easily cut off. Therefore, the entire catalyst removal section can be easily cut off, and the catalyst removal opening having a size required for removing a catalyst with high workability can be easily formed. The annular shallow groove is formed to have a depth with no possibility of occurrence of a crack or fracture due to the thermal stress acting on the outer circumferential wall.

(7) One end portion of the wall face surrounded by annular shallow groove 30 may have a protrusion such as headed shaft portion 34 (see, FIG. 3), projecting shaft 35 (see, FIG. 4), or bottomed short pipe 36 (see, FIG. 5) that can be cut off, in a manner that a hole can be formed in the wall surface by cutting the protrusion off. An external force is applied to the protrusion to cut off the protrusion, and, thus, to form hook hole 32. A tool such as a bar is hooked in hook hole 32, and then one end portion of the wall surface surrounded by annular shallow groove 30 is strongly pulled, whereby the entire wall surface surrounded by annular shallow groove 30 is cut off, and consequently the catalyst removal opening can be easily formed in catalyst removal section 29.

(8) Shelf plates 26a, 26b, and 26c dividing catalyst filling space 24 into two or more regions arranged in the axial direction may be provided. The respective shelf plates are fixed to the inner circumferential wall of catalyst filling space 24 without being fixed to the outer circumferential wall. The catalyst filling catalyst filling space 24 is supported by the multiple shelf plates, and consequently it is possible to prevent the catalyst from being unevenly distributed toward the lower portion of catalyst filling space 24 due to the degradation of the catalyst and to prevent the catalyst action from being reduced due to the uneven distribution of the catalyst. Although catalyst filling space 24 is divided into a plurality of regions by the shelf plates, shelf plates 26a, 26b, and 26c are not fixed to the outer circumferential wall, and therefore, the catalyst removal opening provided over substantially the entire length in the axial direction of catalyst filling space 24 can be formed, whereby the catalyst can be removed with high workability.

Embodiment 2

Figure 7A:
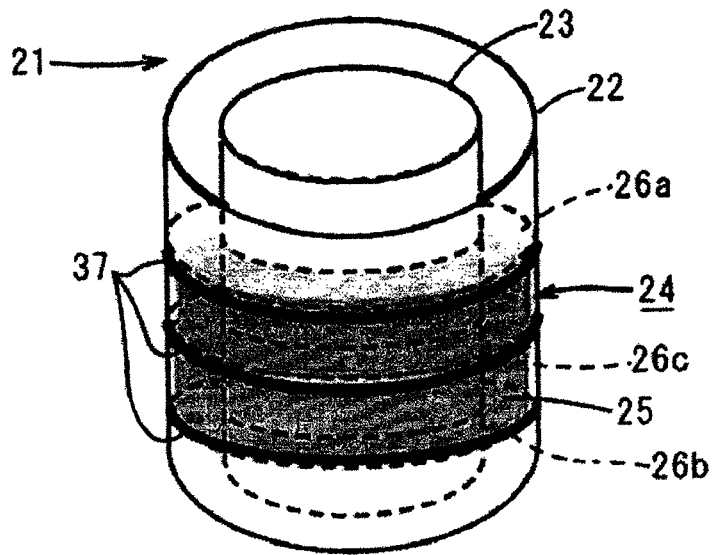
FIG. 7A is a perspective view showing a relevant structure of a fuel treatment device according to Embodiment 2.
Figure 7B:
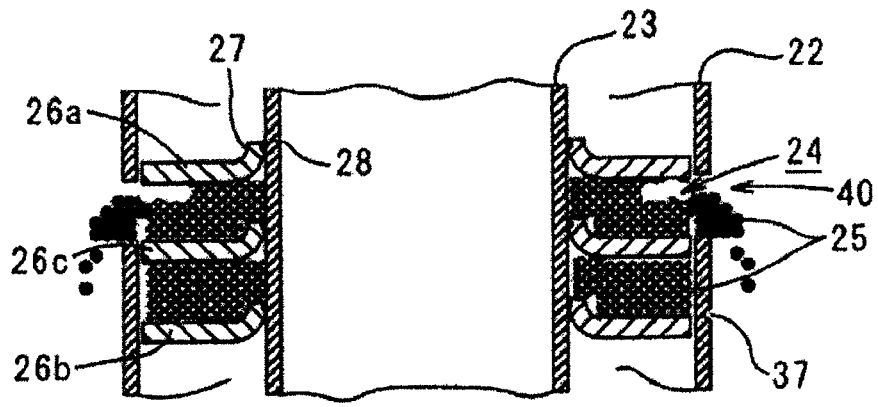
FIG. 7B is a cross-sectional view showing a relevant structure of the fuel treatment device according to Embodiment 2 in a first state when the catalyst is removed.
Figure 7C:
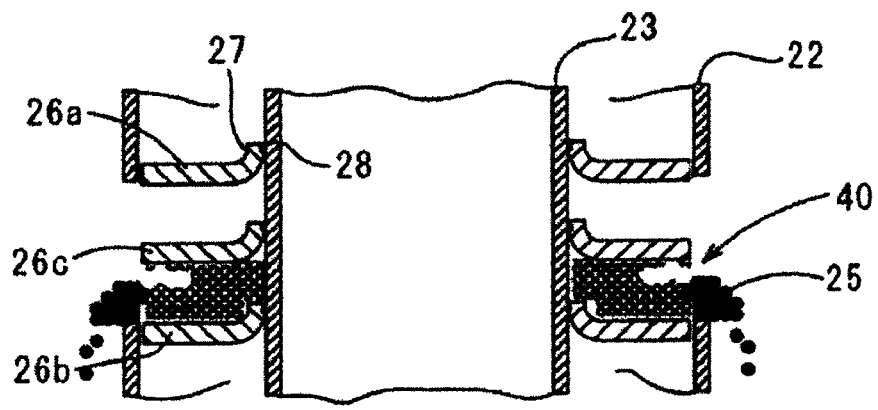
FIG. 7C is a cross-sectional view of the relevant structure of the fuel treatment device according to Embodiment 2 in a second state when the catalyst is removed.

FIGS. 7A to 7C show a relevant structure of a fuel treatment device according to Embodiment 2 of the present invention. FIG. 7A is a perspective view of a relevant portion of the fuel treatment device. FIG. 7B is a cross-sectional view of the relevant portion of the fuel treatment device in a first state when a catalyst is removed. FIG. 7C is a cross-sectional view of the relevant portion of the fuel treatment device in a second state when the catalyst is removed. In Embodiment 2, the same components as those in Embodiment 1 are assigned the same reference numerals, and the descriptions of the overlapping portions are not repeated.

In Embodiment 1, catalyst removal section 29 partitioned by oval annual shallow groove 30 is provided over substantially the entire length in the axial direction of catalyst filling space 24. On the other hand, in Embodiment 2, as shown in FIG. 7A, not one but two or more annular shallow grooves 37 provided over the entire circumference in the circumferential direction are formed on the outer circumferential surface of outer circumferential wall 22. Namely, annular shallow grooves 37 are formed at positions respectively corresponding to shelf plates 26a and 26b partitioning at least the both end positions in the axial direction of catalyst filling space 24, preferably partitioning the both ends of catalyst filling space 24. In addition, when necessary, annular shallow groove 37 may be formed between the both end positions, that is, at a position facing intermediate shelf plate 26c. Annular shallow groove 37 serves as the removal section indicator and the opening formation assister.

As shown in FIG. 7B, when catalyst 25 is collected, outer circumferential wall 22 between upper shelf plate 26a and intermediate shelf plate 26c is cut off to form catalyst removal opening 40, and catalyst 25 between upper shelf plate 26a and intermediate shelf plate 26c is removed. Further, as shown in FIG. 7C, outer circumferential wall 22 between intermediate shelf plate 26c and lower shelf plate 26b is cut off to form catalyst removal opening 40, and catalyst 25 between intermediate shelf plate 26c and lower shelf plate 26b is removed. According to this structure, the total amount of catalyst 25 filling catalyst filling space 24 can be removed with high workability.

Embodiment 3

Figure 8A:
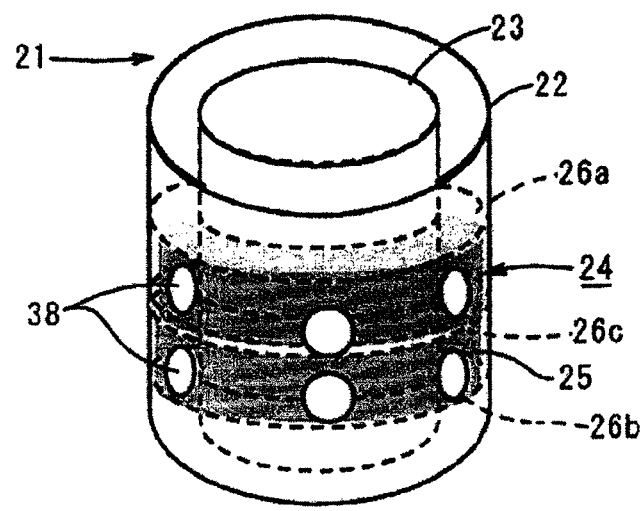
FIG. 8A is a perspective view showing a relevant structure of a fuel treatment device according to Embodiment 3.
Figure 8B:
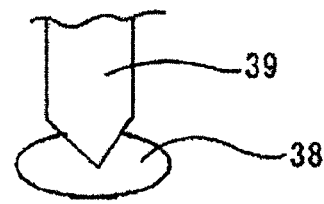
FIG. 8B is a perspective view showing a relevant structure of the fuel treatment device according to Embodiment 3 in a state that a catalyst removal opening is formed.
Figure 8C:
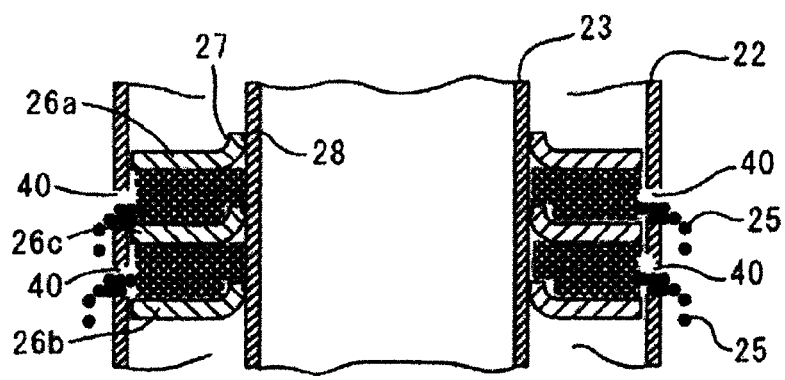
FIG. 8C is a cross-sectional view showing the relevant structure of the fuel treatment device according to Embodiment 3 when the catalyst is removed.

FIGS. 8A to 8C show a relevant structure of a fuel treatment device according to Embodiment 3 of the present invention. FIG. 8A is a perspective view of a relevant portion of the fuel treatment device. FIG. 8B shows a state that the catalyst removal opening is formed. FIG. 8C is a cross-sectional view of the relevant portion of the fuel treatment device when the catalyst is removed.

As shown in FIG. 8A, removal section indication marks 38 for indicating the catalyst removal section are provided on the outer circumferential surface of outer circumferential wall 22 surrounding catalyst filling space 24. As shown in FIG. 8B, when catalyst 25 is collected, outer circumferential wall 22 is bored with a drill 39 or the like at the position of removal section indication mark 38. As shown in FIG. 8C, catalyst 25 can be removed with high workability through the holes as catalyst removal openings 40 formed by boring outer circumferential wall 22.

Embodiment 3 is a reference example of a plurality of removal section indication marks 38 and catalyst removal openings 40 each bored using removal section indication mark 38 as a mark. The opening formation assister can have a structure similar to those of fuel treatment devices of Embodiments 1 and 2.

Embodiment 4

Figure 9:
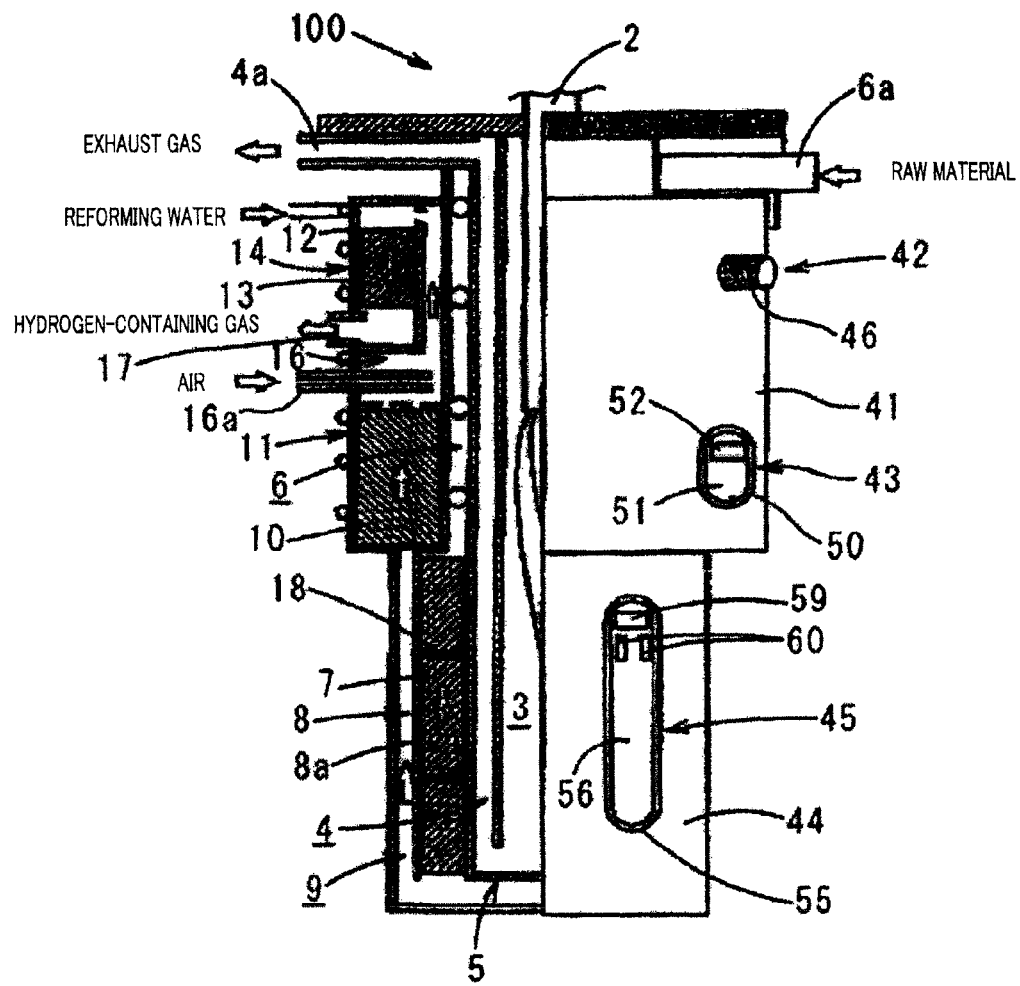
FIG. 9 is a semi-cross-sectional front view of a fuel treatment device according to Embodiment 4.

Embodiment 4 is an example in which the present invention is applied to the conventional fuel treatment device 1 of FIG. 1. FIG. 9 is a semi-cross-sectional front view of a fuel treatment device according to Embodiment 4 of the present invention. The same components as those in FIG. 1 are assigned the same reference numerals, and the descriptions of the overlapping portions are not repeated.

As shown in FIG. 9, fuel treatment device 100 comprises CO remover 14 filled with CO removal catalyst 13 and CO transformer 11 filled with CO transforming catalyst 10. Each outer circumferential wall of CO remover 14 and CO transformer 11 is upper outer circumferential wall 41. Upper outer circumferential wall 41 has CO removal catalyst removal section 42 provided at a proper position corresponding to CO remover 14 and has CO transforming catalyst removal section 43 provided at a proper position corresponding to CO transformer 11.

Fuel treatment device 100 further comprises reformer 8 filled with reforming catalyst 7. The outer circumferential wall of reformer 8 is outer circumferential wall 8a. Lower outer circumferential wall 44 is provided on the outer side of outer circumferential wall 8a through second gas passage 9. Reforming catalyst removal section 45 is provided at a proper position of outer circumferential wall 44.

CO removal catalyst removal section 42, CO transforming catalyst removal section 43, and reforming catalyst removal section 45 each have the removal section indicator and the opening formation assister. A catalyst filling space of reformer 8 includes shelf plate 18 similar to shelf plate 26c of Embodiment 1. Shelf plate 18 divides the catalyst filling space into two or more regions arranged in the axial direction of the catalyst filling space.

Figures 10A, 10B:
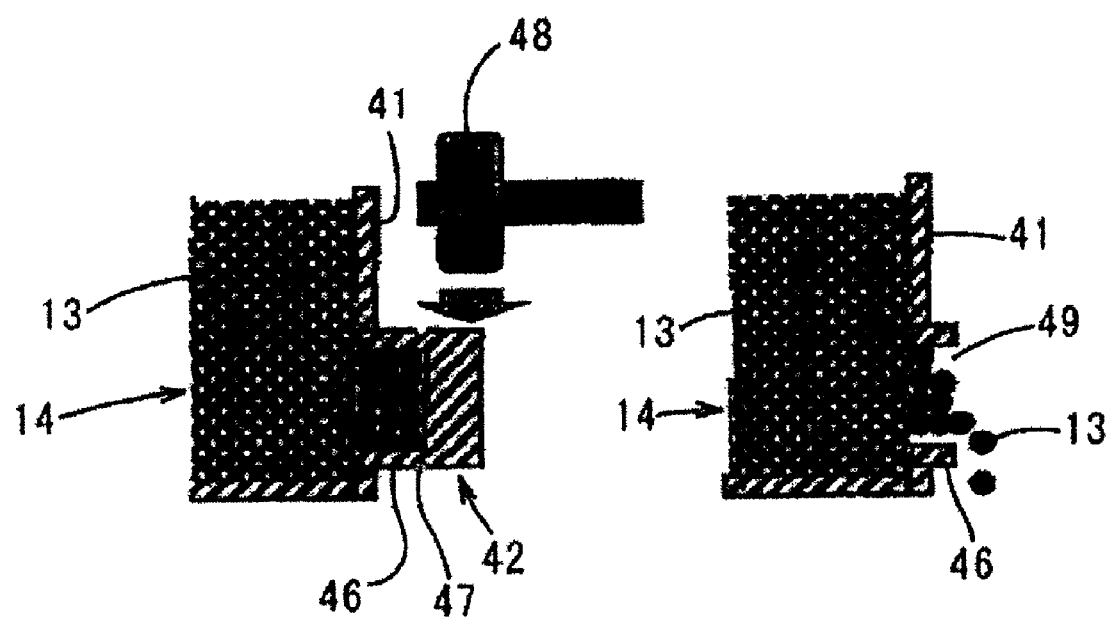
FIG. 10A is a cross-sectional view of a CO removal catalyst removal section of the fuel treatment device according to Embodiment 4.
FIG. 10B is a cross-sectional view of the CO removal catalyst removal section of the fuel treatment device according to Embodiment 4 when the catalyst is removed.

FIG. 10A is a cross-sectional view of CO removal catalyst removal section 42 of the fuel treatment device according to Embodiment 4. FIG. 10B is a cross-sectional view of CO removal catalyst removal section 42 when a catalyst is removed.

As shown in FIG. 10A, CO removal catalyst removal section 42 includes cylindrical protrusion 46, with a closed end, provided to protrude on upper outer circumferential wall 41 and annular groove 47 formed across the entire circumference of the circumferential wall of cylindrical protrusion 46. When CO removal catalyst 13 is removed, the front end portion of cylindrical protrusion 46 is hit by hammer 48 or the like as shown by an arrow in FIG. 10A, whereby, as shown in FIG. 10B, the front end portion of cylindrical protrusion 46 is fractured and removed to form catalyst removal opening 49. CO removal catalyst 13 can be removed through catalyst removal opening 49.

As described above, the circumferential wall of cylindrical protrusion 46 of CO removal catalyst removal section 42 is cut along annular groove 47, whereby catalyst removal opening 49 for removing CO removal catalyst 13 can be easily formed. Since annular groove 47 is formed at the circumferential wall of cylindrical protrusion 46, it is less likely to be affected by the thermal stress acted on upper outer circumferential wall 41.

Figures 11A, 11B:
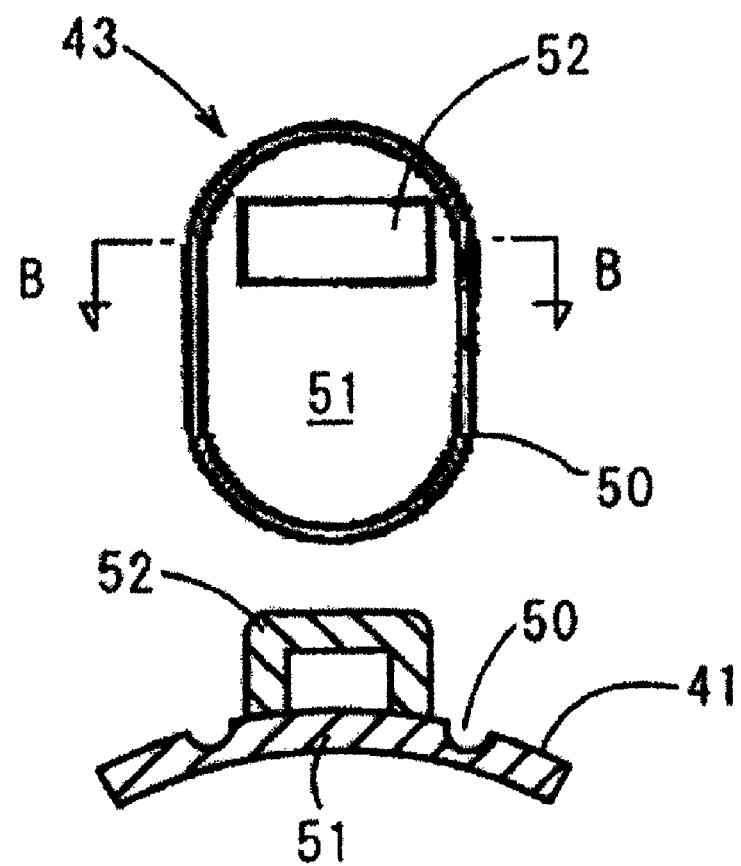
FIG. 11A is a front view of a CO transforming catalyst removal section of the fuel treatment device according to Embodiment 4.
FIG. 11B is a cross-sectional view taken along arrows B-B of FIG. 11A.

FIG. 11A is a front view of CO transforming catalyst removal section 43. FIG. 11B is a cross-sectional view taken along arrows B-B of FIG. 11A.

As shown in FIGS. 11A and 11B, CO transforming catalyst removal section 43 has oval annular shallow groove 50, and annular shallow groove 50 partitions a catalyst removal section 51. Annular shallow groove 50 is formed in upper outer circumferential wall 41 at a portion facing CO transformer 11 and has an oval shape with a length slightly shorter than the length in the axial direction of CO transformer 11. Further, U-shaped hook member 52 is fixed to the upper portion of catalyst removal section 51.

Figure 12A:
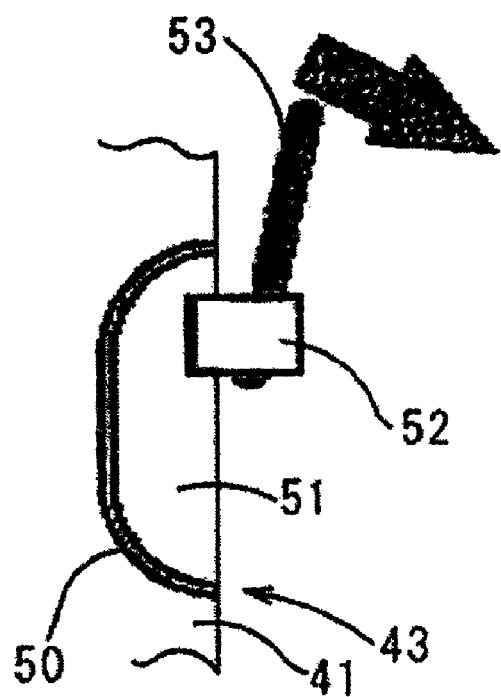
FIG. 12A is a side view of the CO transforming catalyst removal section of the fuel treatment device according to Embodiment 4 showing a first process for removing a CO transforming catalyst.

FIG. 12A is a side view of CO transforming catalyst removal section 43, showing a first process for removing CO transforming catalyst 10. FIG. 11B is a side view of CO transforming catalyst removal section 43, showing a second process for removing CO transforming catalyst 10.

Figure 12B:
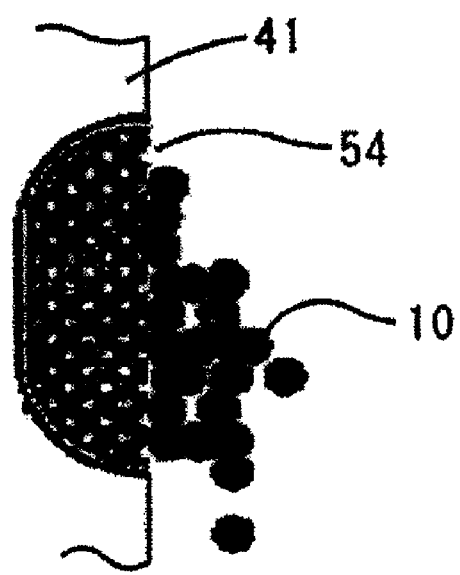
FIG. 12B is a side view of the CO transforming catalyst removal section of the fuel treatment device according to Embodiment 4 showing a second process for removing the CO transforming catalyst.

As shown in FIG. 12A, when CO transforming catalyst 10 is removed, one end of a tool such as bar 53 is inserted into hook member 52, and the other end of bar 53 is strongly pulled down as shown by the arrow. Catalyst removal section 51 is then easily cut off from upper outer circumferential wall 41 along annular groove 50, and thus catalyst removal opening 54 is formed. As shown in FIG. 12B, CO transforming catalyst 10 is removed outside through catalyst removal opening 54 for collection.

As described above, CO transforming catalyst removal section 43 has the same basic structure as that of Embodiment 1, and similar effects can be obtained.

Figure 13A:
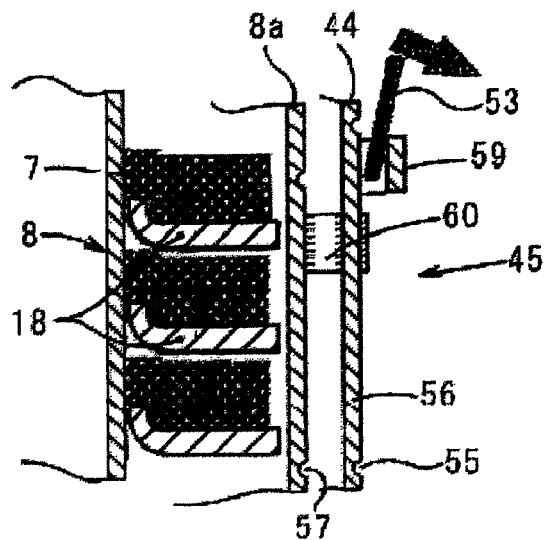
FIG. 13A is a cross-sectional side view of a reforming catalyst removal section of the fuel treatment device according to Embodiment 4 showing a first process for removing a reforming catalyst.
Figure 13B:
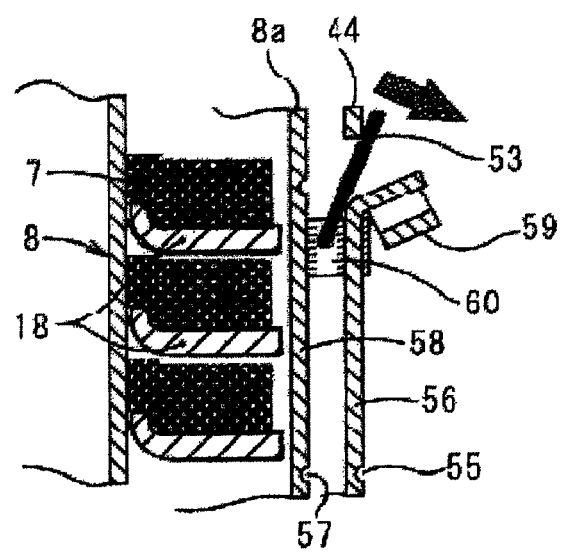
FIG. 13B is a cross-sectional side view of the reforming catalyst removal section of the fuel treatment device according to Embodiment 4 showing a second process for removing the reforming catalyst.
Figure 13C:
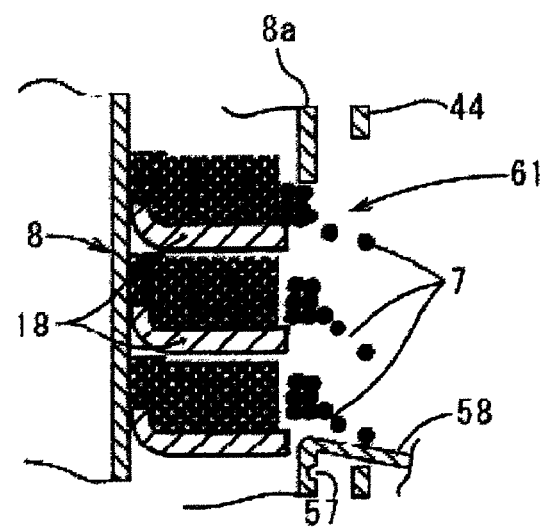
FIG. 13C is a cross-sectional side view of the reforming catalyst removal section of the fuel treatment device according to Embodiment 4 showing a third process for removing the reforming catalyst.

FIGS. 13A to 13C are cross-sectional side views of reforming catalyst removal section 45, showing a process for removing a reforming catalyst from fuel treatment device 100.

As shown in FIGS. 13A and 13B, reforming catalyst removal section 45 includes catalyst removal section 56 and inner catalyst removal section 58. Catalyst removal section 56 is provided at lower outer circumferential wall 44 and partitioned by oval annular shallow groove 55. Annular shallow groove 55 has an oval shape with a length slightly shorter than the length in the axial direction of reformer 8. On the other hand, inner catalyst removal section 58 is provided at outer circumferential wall 8a of reformer 8, located at a position facing annular shallow groove 55, and partitioned by annular shallow groove 57.

U-shaped hook member 59 is fixed to the upper end portion of catalyst removal section 56. A pair of connecting pieces 60 are each provided near the lower portion of hook member 59 and provided between the surfaces of catalyst removal section 56 and inner catalyst removal section 58 facing each other. The pair of connecting pieces 60 are spaced from each other.

As shown in FIG. 13A, when reforming catalyst 7 is removed, one end of a tool such as bar 53 is inserted into hook member 59, and the other end of bar 53 is strongly pulled down as shown by the arrow. As shown in FIG. 13B, the upper end portion of catalyst removal section 56 (to the position of connecting pieces 60) is cut and separated from lower outer circumferential wall 44 along annular shallow groove 55 to be folded to the outside.

Next, as shown in FIG. 13B, one end of a tool such as bar 53 is inserted between the pair of connecting pieces 60 provided between catalyst removal section 56 and inner catalyst removal section 58, and the other end of bar 53 is strongly pulled down as shown by the arrow. Catalyst removal section 56 and inner catalyst removal section 58 are then easily cut and separated respectively from lower outer circumferential wall 44 and outer circumferential wall 8a of reformer 8 along annular shallow grooves 55 and 57. According to this structure, catalyst removal opening 61 is formed. Reforming catalyst 7 can be removed outside through catalyst removal opening 61 for collection, and effects similar to those of Embodiment 1 can be obtained.

According to the present embodiment, a protrusion that can be cut off is provided at one end portion of the wall surface surrounded by the annual shallow groove, and an external force is applied to the protrusion to cut off the protrusion, whereby a hole can be formed in the wall surface. A tool such as a bar is hooked into the hole, and an end portion of the wall surface surrounded by the annular shallow groove is strongly pulled down, whereby the wall surface surrounded by the annular shallow groove is cut off, and consequently the catalyst removal opening can be formed in the catalyst removal section.

The opening formation assister is a shallow groove provided over the entire circumference in the circumferential direction of the outer circumferential wall, and the shallow groove can be provided at least at the both end positions in the axial direction of the catalyst filling space. The outer circumferential wall is cut along the shallow groove, whereby the entire circumference of the catalyst filling space is opened, and therefore, the catalyst can be removed with high workability.

The opening formation assister can include a cylindrical protrusion, with a closed end, provided to protrude on the outer circumferential wall of the catalyst filling space, and an annular groove formed over the entire circumference of the circumferential wall of the cylindrical protrusion. The circumferential wall of the cylindrical protrusion is cut at the position of the annular groove to remove the front end portion of the cylindrical protrusion, whereby the catalyst removal opening can be easily formed. Since the annular groove is formed at the circumferential wall of the cylindrical protrusion, it is less likely to be affected by the thermal stress acting on the outer circumferential wall of the catalyst filling space.

The above description is for exemplary purposes only for preferred embodiments of the present invention, and the scope of the present invention is not limited thereto. For example, the specific structures of CO removal catalyst removal section 42 and CO transforming catalyst removal section 43 shown in each embodiment are not limited to the illustrated and described ones. The structures of CO removal catalyst removal section 42 and CO transforming catalyst removal section 43 may be interchanged, or either one of the structures may be applied to both of CO removal catalyst removal section 42 and CO transforming catalyst removal section 43. CO removal catalyst removal section 42 and CO transforming catalyst removal section 43 may have any of the structures in the structure examples shown in Embodiment 1.

The specific structure of reforming catalyst removal section 45 is not limited to the illustrated and described one. For example, each structure example of catalyst removal section 29 and the structures of CO removal catalyst removal section 42 and 43 may be applied to catalyst removal section 56 and inner catalyst removal section 58, respectively.

In the above embodiments, catalyst filling space 24 is surrounded by cylindrical inner circumferential wall 23 and cylindrical outer circumferential wall 22; however, catalyst filling space 24 may be surrounded by only outer circumferential wall 22. Namely, any structure may be applied as long as the position of the catalyst removal section is indicated on the outer circumferential surface of the outer circumferential wall, and the opening formation assister is provided at the catalyst removal section.

In each of the above embodiments, the shelf plate is fixed to inner circumferential wall 23; however, the shelf plate may have any structure as long as the shelf is not fixed to the outer circumferential wall surrounding the catalyst filling space. For example, when catalyst filling space 24 is surrounded by only outer circumferential wall 22, the shelf plate is never fixed to inner circumferential wall 23.

For convenience's sake of explanation, the name specified as the fuel treatment device is used; however, it is needless to say that the name specified as a fuel reformer or the like may be used. Further, a fuel gas used in the fuel treatment device, the number and kind of catalysts, and a method for treating the catalyst are not limited to those of the above embodiments.

The entire disclosure of the specification, the drawings, and the abstract contained in Japanese Patent Application No. 2008-155417 filed on Jun. 13, 2008 is incorporated into the present application.

INDUSTRIAL APPLICABILITY

In a fuel treatment device according to the present invention, the opening is formed in the catalyst removal section indicated by the removal section indicator on the outer circumferential wall, whereby the opening communicating to the catalyst filling space can be formed without a troublesome work of confirming the position of the catalyst filling space. Consequently, the catalyst filling the catalyst filling space can be easily removed. The catalyst can be removed through the opening formed for each catalyst filling space, and therefore, the catalysts can be reliably separated and collected for each kind of catalyst, whereby the possibility of mixing different kinds of catalysts before removal can be reduced.

In particular, according to the present invention, catalysts contained in a fuel treatment device, which reforms a hydrocarbon-based fuel gas to produce a hydrogen-rich reformed gas, and, thus, to supply the reformed gas to a fuel cell, can be collected and recycled.

EXPLANATION OF REFERENCE NUMERALS

18, 26a to 26c, 126a to 126c Shelf plate
21, 100, 121 Fuel treatment device
22 Outer circumferential wall
23 Inner circumferential wall
24 Catalyst filling space
25 Catalyst
29, 51, 56 Catalyst removal section
30, 37, 50, 55, 57 Annular shallow groove (removal section indicator, opening formation assister)
31 Catalyst indicator
32 Hook hole
34 Headed shaft portion (protrusion)
35 Projecting shaft (protrusion)
36 Short pipe (protrusion)
38 Removal section indication mark (removal section indicator)
40, 49, 54, 61 Catalyst removal opening
41 Upper outer circumferential wall
42 CO removal catalyst removal section
43 CO transforming catalyst removal section
44 Lower outer circumferential wall
45 Reforming catalyst removal section
46 Cylindrical protrusion
47 Annular groove
58 Inner catalyst removal section
70 Fuel gas
71 Air
72 Water
73 Hydrogen-containing gas
74 Exhaust gas

The invention claimed is:

1. A fuel treatment device in which a fuel gas is supplied to a catalyst to produce a reformed gas, the catalyst filling a catalyst filling space which is surrounded by a cylindrical outer circumferential wall or by a cylindrical inner circumferential wall and the cylindrical outer circumferential wall, the catalyst filling space being disposed along a center axis of a cylinder, the device comprising:
  a removal section indicator indicating a position of a catalyst removal section placed on a lateral face of the cylindrical outer circumferential wall, the removal section indicator being placed on an outer surface of the outer circumferential wall; and
  an opening formation assister that assists formation of a catalyst removal opening in the catalyst removal section, wherein
  the catalyst removal section can be cut off from the lateral face of the cylindrical outer circumferential wall, or the lateral face of the cylindrical outer circumferential wall can be fractured at the catalyst removal section.

2. The fuel treatment device according to claim 1, further comprising:
  one or more shelf plates which divide the catalyst filling space into two or more regions arranged in the axial direction,
  wherein the shelf plate is formed without being fixed to the outer circumferential wall surrounding the catalyst filling space.

3. The fuel treatment device according to claim 1, further comprising:
  one or more shelf plates which divide the catalyst filling space into two or more regions arranged in the axial direction,
  wherein the shelf plate is fixed to the inner circumferential wall surrounding the catalyst filling space.

4. The fuel treatment device according to claim 1, wherein the opening formation assister functions as the removal section indicator or is different means from the removal section indicator.

5. The fuel treatment device according to claim 1, further comprising a catalyst indicator that indicates the kind of the catalyst loaded.

6. The fuel treatment device according to claim 1, wherein the catalyst removal section is provided at a portion in the circumferential direction of the outer circumferential wall, and
  the opening formation assister is formed at an outer circumferential surface or an inner circumferential surface of the outer circumferential wall and includes an annular shallow groove surrounding the peripheral edge of the catalyst removal section.

7. The fuel treatment device according to claim 1, wherein the catalyst removal section is provided over substantially the entire length in the axial direction of the catalyst filling space and has an oval shape.

8. The fuel treatment device according to claim 1, wherein the catalyst removal section is provided over the entire circumference in the circumferential direction of the outer circumferential wall,
  the opening formation assister is formed at an outer circumferential surface or an inner circumferential surface of the outer circumferential wall and includes two or more shallow grooves provided over the entire circumference in the circumferential direction, and
  the shallow grooves are provided at least at both ends in the axial direction of the catalyst filling space.

9. The fuel treatment device according to claim 1, wherein the opening formation assister includes a cylindrical protrusion, with a closed end, provided on the outer circumferential surface of the outer circumferential wall surrounding the catalyst filling space and a groove formed over the entire circumference of a circumferential wall of the cylindrical protrusion.

10. The fuel treatment device according to claim 1, the opening formation assister is a shallow groove surrounding a peripheral edge of the catalyst removal section, the opening formation assister being formed on the outer surface or inner surface of the outer circumferential wall.

11. The fuel treatment device according to claim 10, further comprising a protrusion capable of being cut off provided on the outer circumferential surface of the outer circumferential wall surrounded by the annular shallow groove, wherein when the protrusion is cut off, a through-hole is formed in the outer circumferential wall.

* * * * *